US010088335B2

(12) United States Patent
Hampapur et al.

(10) Patent No.: US 10,088,335 B2
(45) Date of Patent: Oct. 2, 2018

(54) ANOMALY DETECTION USING USAGE DATA FOR METERING SYSTEM (75) Inventors: Arun Hampapur, Norwalk, CT (US); Zhong Bo Jiang, Beijing (CN); Hongfei Li, Yorktown Heights, NY (US); Shilpa N. Mahatma, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 617 days.

(21) Appl. No.: 13/446,701

(22) Filed: Apr. 13, 2012

(65) Prior Publication Data

US 2013/0271289 A1 Oct. 17, 2013

(51) Int. Cl.
*G01D 4/00* (2006.01)
(52) U.S. Cl.
CPC ............ *G01D 4/004* (2013.01); *Y02B 90/242* (2013.01); *Y04S 20/322* (2013.01); *Y04S 20/36* (2013.01)
(58) Field of Classification Search
CPC ........ G01D 4/002; G01D 4/004; G01D 4/006; G01D 4/008; G01R 21/1336; G01M 3/26; G01M 3/2807; E21B 47/1025; G06Q 50/06; G06Q 10/06; Y04S 20/36; Y10T 137/0318
USPC .................................................... 340/870.02
See application file for complete search history.

(56) References Cited

U.S. PATENT DOCUMENTS

| | | | | |
|---|---|---|---|---|
| 6,862,540 B1 * | 3/2005 | Welch | ................... | G01F 15/063 340/870.02 |
| 7,920,983 B1 * | 4/2011 | Peleg | ................... | G01M 3/2807 137/1 |
| 8,781,767 B2 * | 7/2014 | Hoogs | ................... | G06Q 10/04 702/179 |
| 9,568,392 B2 * | 2/2017 | Peleg | ................... | G01M 3/2807 |
| 9,816,836 B2 * | 11/2017 | Steigler | ................... | G01D 4/002 |
| 2003/0101009 A1 * | 5/2003 | Seem | ....................... | H02J 3/00 702/61 |
| 2007/0247331 A1 * | 10/2007 | Angelis | .................. | G01D 4/006 340/870.02 |
| 2008/0272933 A1 * | 11/2008 | Cahill-O'Brien | ...... | G01D 4/006 340/870.02 |
| 2009/0045976 A1 * | 2/2009 | Zoldi | .................... | G01D 4/004 340/870.02 |

(Continued)

*Primary Examiner* — An T Nguyen
(74) *Attorney, Agent, or Firm* — Scully, Scott, Murphy & Presser, P.C.; Daniel Morris, Esq.

(57) ABSTRACT

A method, system and computer program product for detecting anomalies in a metering system. In one embodiment, data representing usage of a defined commodity are collected from meters, and the data collected over a given time period are analyzed to identify any of the meters showing at least one defined type of anomalous usage pattern. For each of the meters showing an anomalous usage patterns, an anomaly score is determined for the usage pattern shown, and the anomaly scores are used to rank the meters. In one embodiment, the collected data are analyzed to identify any of the meters showing one or more of a group of types of anomalous patterns including meter-no-reading, meter-bypass, and meter-silting patterns. Embodiments of the invention utilize time series techniques and data analysis on meter reading data. Further, embodiments of the invention require no additional installation of equipment or sensors.

24 Claims, 8 Drawing Sheets

(56) References Cited

U.S. PATENT DOCUMENTS

| | | | |
|---|---|---|---|
| 2010/0185499 A1* | 7/2010 | Dwarakanath | G06Q 10/04 705/7.31 |
| 2010/0286937 A1* | 11/2010 | Hedley | G06Q 30/02 702/60 |
| 2011/0153236 A1* | 6/2011 | Montreuil | G01R 19/2513 702/59 |
| 2011/0191267 A1* | 8/2011 | Savic | E03B 7/02 705/412 |
| 2011/0215945 A1* | 9/2011 | Peleg | G01M 3/2807 340/870.02 |
| 2012/0036250 A1* | 2/2012 | Vaswani | G01D 4/004 709/224 |
| 2012/0109716 A1* | 5/2012 | Giat | G06Q 30/0206 705/7.35 |
| 2012/0185184 A1* | 7/2012 | Armon | G05B 23/024 702/51 |
| 2013/0066570 A1* | 3/2013 | Sfaelos | G01D 1/16 702/62 |
| 2013/0124436 A1* | 5/2013 | Cardenas Mora | G06F 17/18 706/12 |
| 2013/0151179 A1* | 6/2013 | Gray | G01D 4/002 702/62 |
| 2013/0271289 A1* | 10/2013 | Hampapur | G01D 4/004 340/870.02 |
| 2013/0289904 A1* | 10/2013 | Marwah | G01D 4/00 702/61 |
| 2013/0332090 A1* | 12/2013 | Scolnicov | G06N 7/005 702/50 |

\* cited by examiner

AN EXAMPLE OF A METER-NO-READING PROBLEM WHERE FOR SOME TIME PERIODS THE METER HAS NOT READINGS

FIG. 7

AN EXAMPLE OF A METER-BY-PASS PROBLEM WHERE SOME SUDDEN DROPS IN READINGS ARE DETECTED

FIG. 8

ANOMALY DETECTION USING USAGE DATA FOR METERING SYSTEM

BACKGROUND OF THE INVENTION

This invention generally relates to detecting anomalies in utility meters, and more specifically, to detecting anomalies in metering systems through data analysis of meter readings.

Meter malfunctioning problems widely exist in many utility industries such as the water and electricity utilities. Major issues include meter-no-reading, meter-by-pass and meter-silting problems. Most of the time, meter malfunctions are due to aging and deterioration. Sometimes, the recorded water and electricity power consumption may be less than the actual consumption due to theft, which causes revenue loss for the utility companies. Other losses or anomalies in meter reading may occur for other reasons. For example, leaks may develop in water lines, causing an unusual increase in water meter readings.

Detection of meter anomalies plays an important role in asset management. However, it is expensive and unrealistic to check each meter to identify defective ones.

BRIEF SUMMARY

Embodiments of the invention provide a method, system and computer program product for detecting anomalies in a metering system comprising a multitude of meters used to measure usage of a defined commodity. In one embodiment, the method comprises collecting data from the meters, including data representing usage of the defined commodity, and analyzing the data collected from the meters over a given time period to identify any of the meters showing at least one defined type of anomalous usage pattern. For each of the meters showing one of the anomalous usage patterns, an anomaly score is determined for the usage pattern shown by the meter, and the anomaly scores are used to rank the meters showing the anomalous usage patterns.

In one embodiment, the collected data are analyzed to identify any of the meters showing one or more of a group of defined types of anomalous usage patterns. In an embodiment, this group of defined types of anomalous usage patterns includes meter-no-reading, meter-by-pass, and meter-silting.

In one embodiment, a threshold is identified for the anomaly scores, and the meters showing the anomalous usage patterns having anomaly scores above the threshold, are ranked based on the anomaly scores.

In an embodiment, the data collected from the meters are converted to data representing consumption of the defined commodity over defined equal periods of time, such as a day.

In one embodiment, data values from each of the meters are analyzed to determine whether the data values from said each of the meters changes in a defined way over a defined period of time.

For example, in an embodiment, the data values from each meter may be analyzed to identify meters showing a meter-no-reading pattern and meters showing a meter-by-pass pattern.

In one embodiment, seasonal usage patterns are identified, and the data collected from the meters are adjusted based on these seasonal usage patterns. In an embodiment, the collected data are adjusted based on these seasonal usage patterns before using the collected data to identify any of the meters showing the anomalous usage pattern.

In an embodiment, the only data used to identify any of the meters showing the anomalous usage pattern are the data representing usage of the defined commodity.

Embodiments of the invention identify defective meters solely using data analysis techniques based on historical meter readings which the utility companies collect, for example daily or monthly, for billing purposes.

Embodiments of the invention detect malfunctioning meters using data and analysis of meter readings only. In embodiments of the invention, three major anomalies are considered: meter-no-reading, meter-by-pass, and meter-silting. These types of anomalies can be reflected in the meter readings, and thus detection algorithms can be developed through data analysis of meter readings. Detection algorithms may be varied depending on different types of anomalies and the time scales over which reading data are collected.

Embodiments of the invention utilize time series techniques and data analysis on meter reading data. Expert knowledge may be incorporated into the algorithms to capture anomaly patterns represented in the reading data. Further, embodiments of the invention require no additional installation of equipment or sensors.

DETAILED DESCRIPTION

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
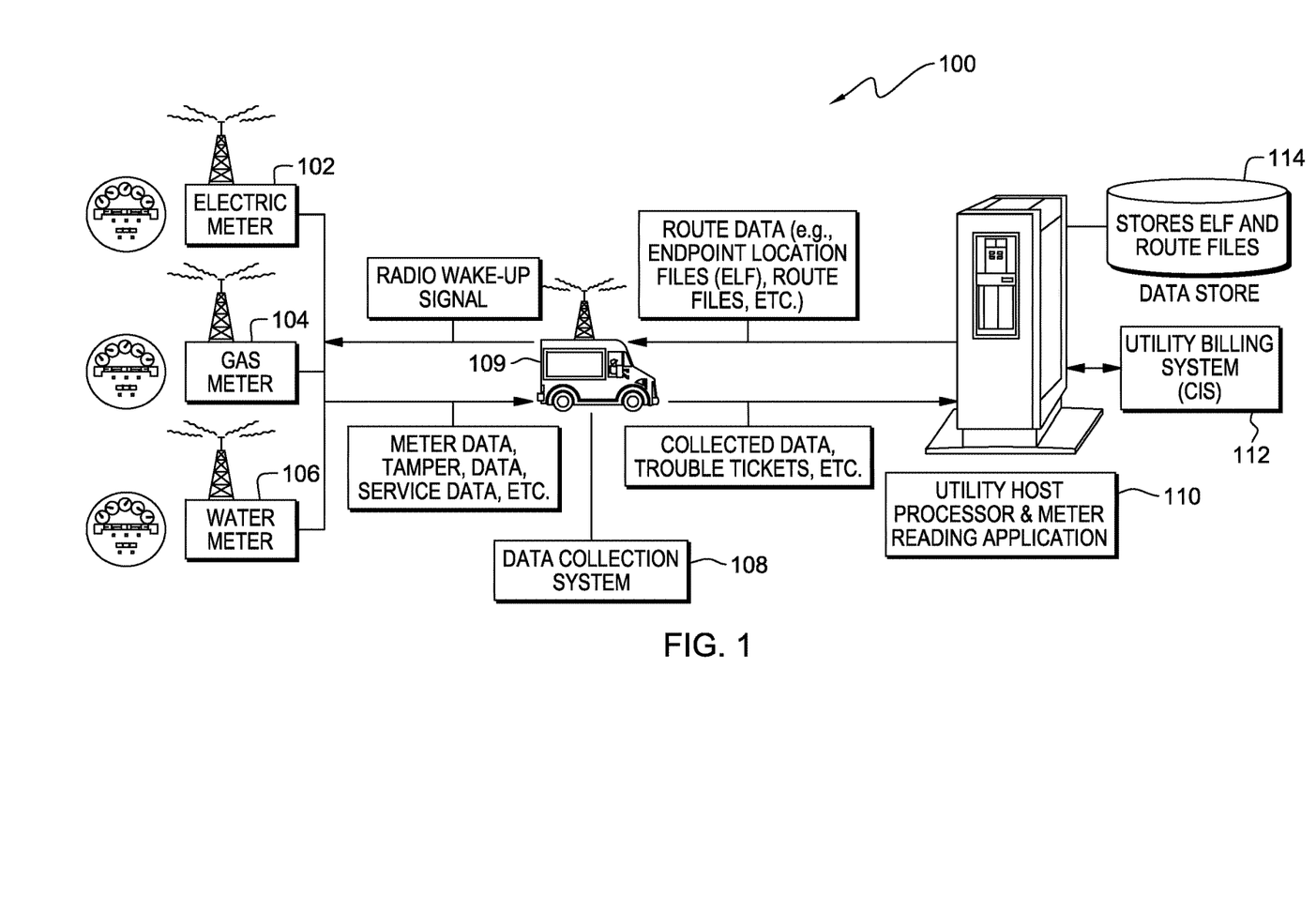
FIG. 1 illustrates a utility data collection system.

Embodiments of the invention provide a method, system and computer program product for detecting anomalies in a metering system. FIG. 1 and the following discussion provide a general description of a suitable environment in which the invention can be implemented. FIG. 1 illustrates an automatic meter reading (AMR) and data collection system 100. The system 100 includes a collection of utility meters or service points (102, 104, and 106). The utility meters may be of the same or different types (e.g., electric 102, gas 104, water 106, or other (not shown)). The utility meters (102, 104, and 106) may be distributed in a bounded or unbounded geographical area. Each utility meter (102, 104, or 106) is connected to or associated with a utility consuming facility (not shown). For example, a utility meter may correspond with a household, a commercial facility, or another utility consuming facility or device.

While not illustrated in detail, each meter (102, 104, or 106) includes a storage component (not shown) for storing collected data before transmission to a data collection system. The storage component may store information identifying the meter, such as a meter identification number. In addition, each meter may be configured with a receiver/transmitter telemetry device (e.g., an encoder receiver transmitter (ERT)) capable of sending and receiving signals to and from a data collection system 108. In general, these components (meter, storage, and telemetry device) may be collectively referred to as an "endpoint." However, the term "endpoint" may herein refer to any one of a number of possible configurations for locally collecting data, such as utility consumption data, and not only the sample configuration described above.

To facilitate automatic meter reading or similar techniques, the data collection system 108 may be installed in a vehicle 109 or be otherwise configured to be transported through a route (e.g., handheld). For example, the vehicle or system may include the appropriate antennas, power supply, any necessary mounts, etc. The system described herein can also be employed in a handheld device, or other in-field device.

The system 100 also includes a host processing system and/or meter reading application(s) 110 for processing collected meter reading data. The host processing system 110 may be a server computer. In some embodiments, the host processing system and/or meter reading application(s) 110 use customer information to create route files used when driving the route to collect meter data. The host processing system and/or meter reading application(s) 110 may operate in association with systems operated by a utility company, such as a utility billing system 112 or, more generally, a customer information system (CIS). In this way, the host processing system and/or meter reading application(s) 110 can also communicate data to the data collection system 108. This information may include both route file and endpoint location file (ELF) data, which may be stored in a data store 114 prior to export from the billing system/CIS. However, in some embodiments, endpoint location files may also be transmitted directly from the billing system/CIS 112 to the mobile data collection system 108. Likewise, data collected by the data collection system 108 may be returned to the host processing system and/or the meter reading application(s) 110 for processing.

Figure 2:
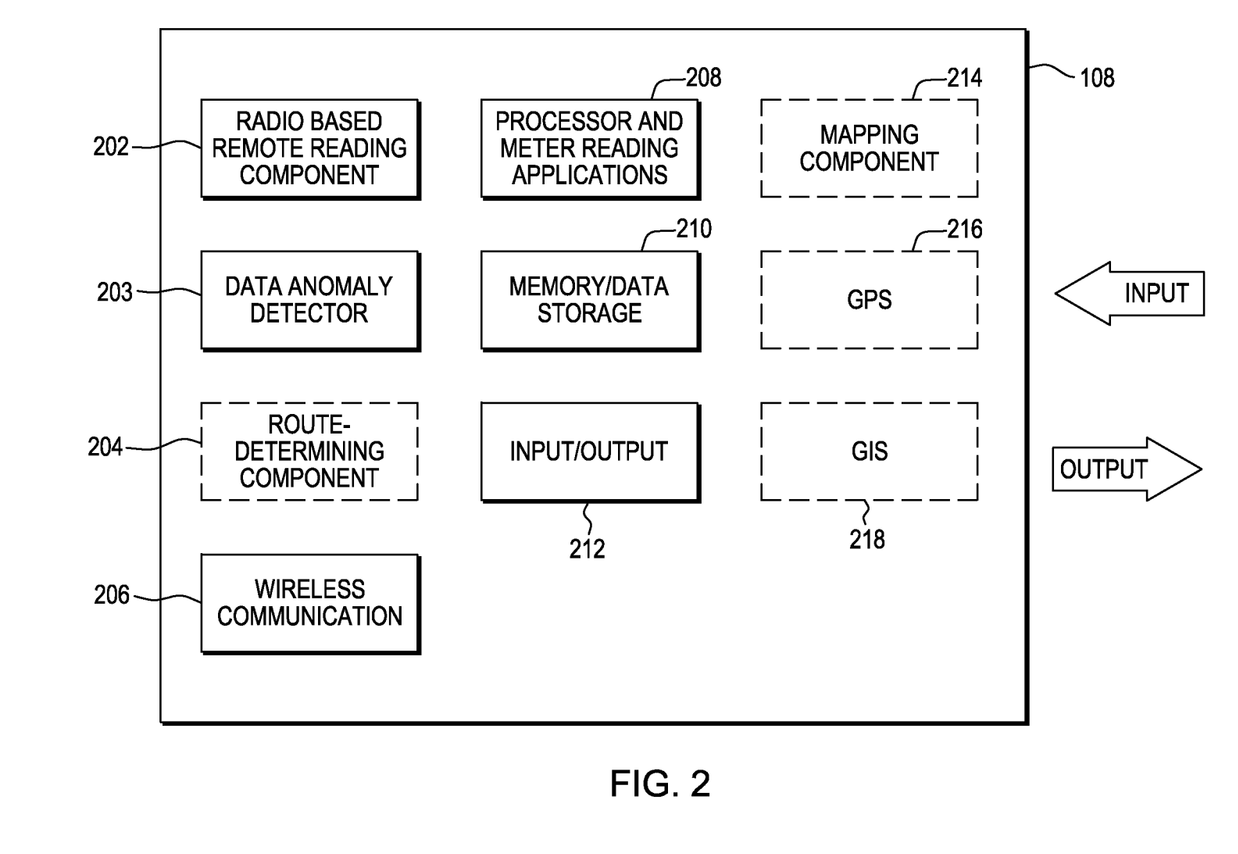
FIG. 2 is a block diagram of a meter or data collecting reading system of FIG. 1.

Referring to FIG. 2, the data collection system 108 of FIG. 1 is shown in more detail. The data collection system 108 includes a remote reading component 202 (e.g., radio based), a data anomaly detector 203 (described below), and an optional sequencing component 204. In some embodiments, these and other portions of the data collection system 108 may effectively be combined into a single system.

The data collection system 108 also includes a wireless component 206, which, in some embodiments, may include an antenna and a transceiver (not shown). The transceiver of the wireless component 206 sends signals to wake up endpoints that function in "wake-up" mode to receive and manage incoming data. A processor with meter-reading and other applications 208 provide capabilities to control several processes, including managing collected data, and other functions described herein.

The data collection system 108 may store collected data in a memory or other storage device 210 associated with the data collection system 108, such as a non-volatile memory. For example, the memory 210 can store not only collected meter data, but also route information, performance, communications statistics, history, and other data noted herein. As described below, the memory 210 can store both internal and external data within the in-field device 108, to thereby avoid the need for the device to access a database at the host processing system 110. This information may be used as input to 204 to help identify anomalous data from endpoints.

A user input/output component 212 provides an appropriate user interface for an operator of the data collection system 108. For example, the data collection system 108 may provide a color touchscreen display for ease of use, and for clear graphical displays. Other user input/output options are possible, including mouses, microphones, speakers, joysticks, keyboards, LCD screens, audio, etc. One application of the input/output component 212 includes displaying and controlling mapping images generated by an optional mapping component 214. In this way, the field worker is provided with feedback, so that he or she can determine which meter readings have been completed on a particular route and so he or she can view endpoints on the route in relation to the vehicle and to other endpoints.

Figure 3:
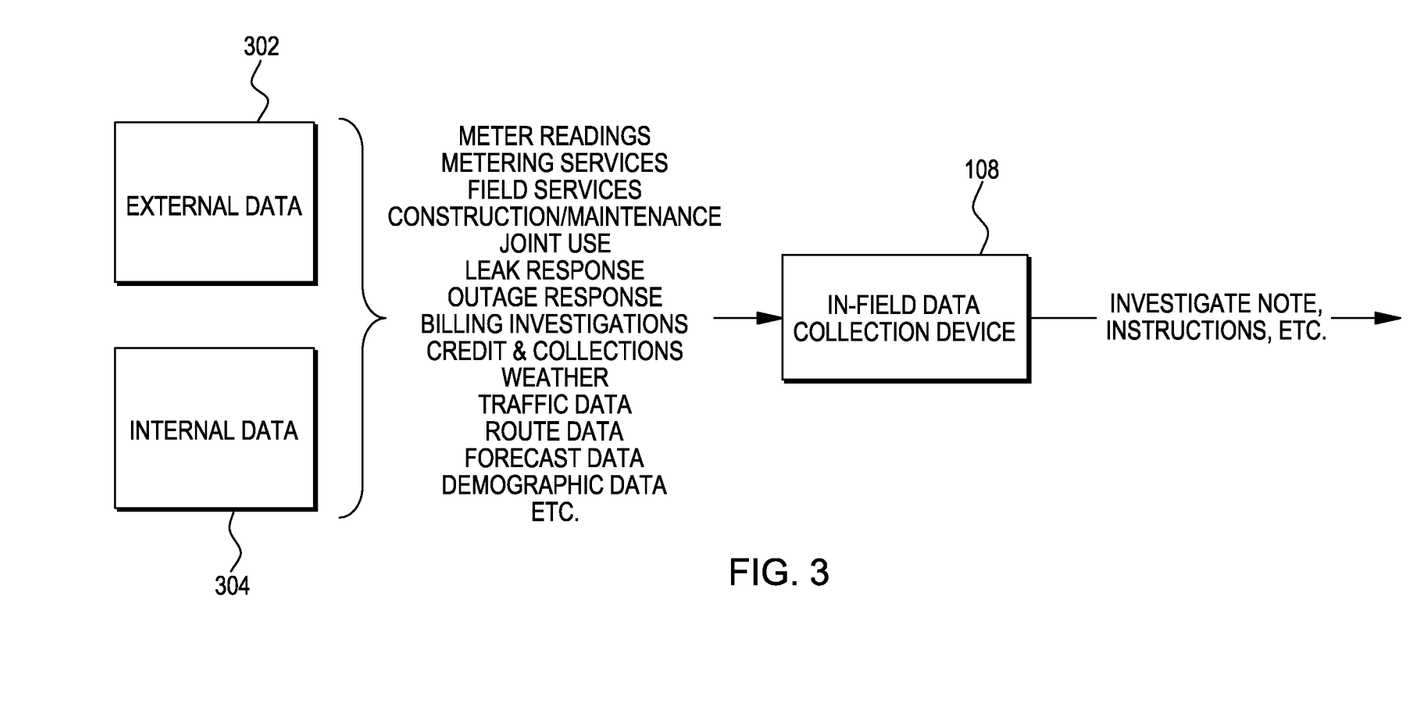
FIG. 3 shows types of data that may be collected and used in a meter data collection system.

Referring to FIG. 3, the data collection device 108 receives external data 302 and internal data 304, with which it applies one or more rules or conditions to generate output to the field worker. External data may represent data external to the system 100, such as weather data, traffic data, demographic data, road construction/maintenance data, news data, etc. Internal data represents data gathered or generated by the system 100, such as meter readings, metering services, field services, utility construction/maintenance data, joint use data, leak or outage response data, billing investigation data, credit and collections data, route data, forecast data.

Figure 4:
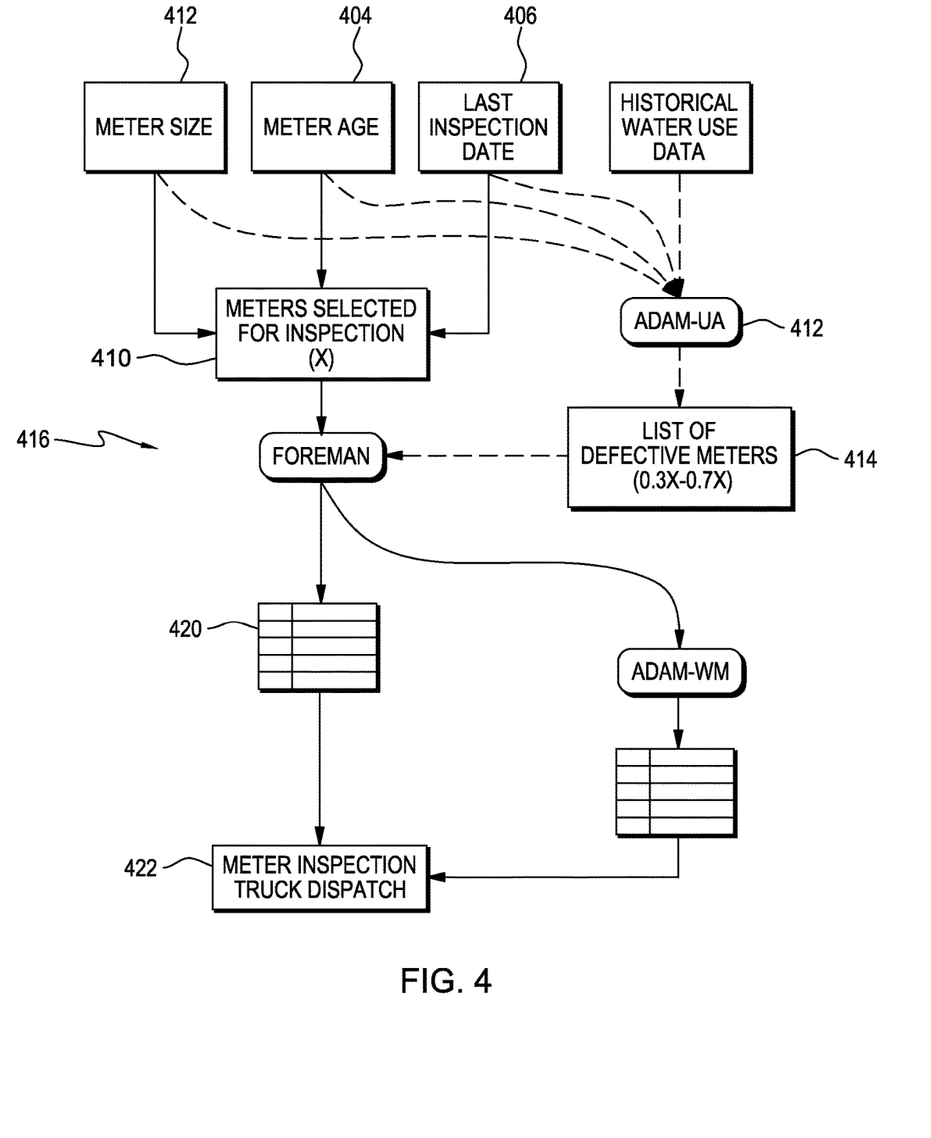
FIG. 4 is a graph showing the use of anomaly detection in a meter system.

FIG. 4 generally illustrates an implementation of an embodiment of the invention. This implementation can be incorporated as a component of an Analytics Driven Asset Management (ADAM) system. In this implementation, data describing the meter size 402, meter age 404, and the last inspection data 406 are used to select meters for inspection 410. These data and historical use data are also input into an ADAM-UA unit 412, which provide a list 414 of possibly defective meters. This list of possibly defective meters is used at 416 to identify the meters 420 that are to be inspected that might be defective. These meters can then be inspected at 422 and the appropriate action or response can be taken.

Figure 5:
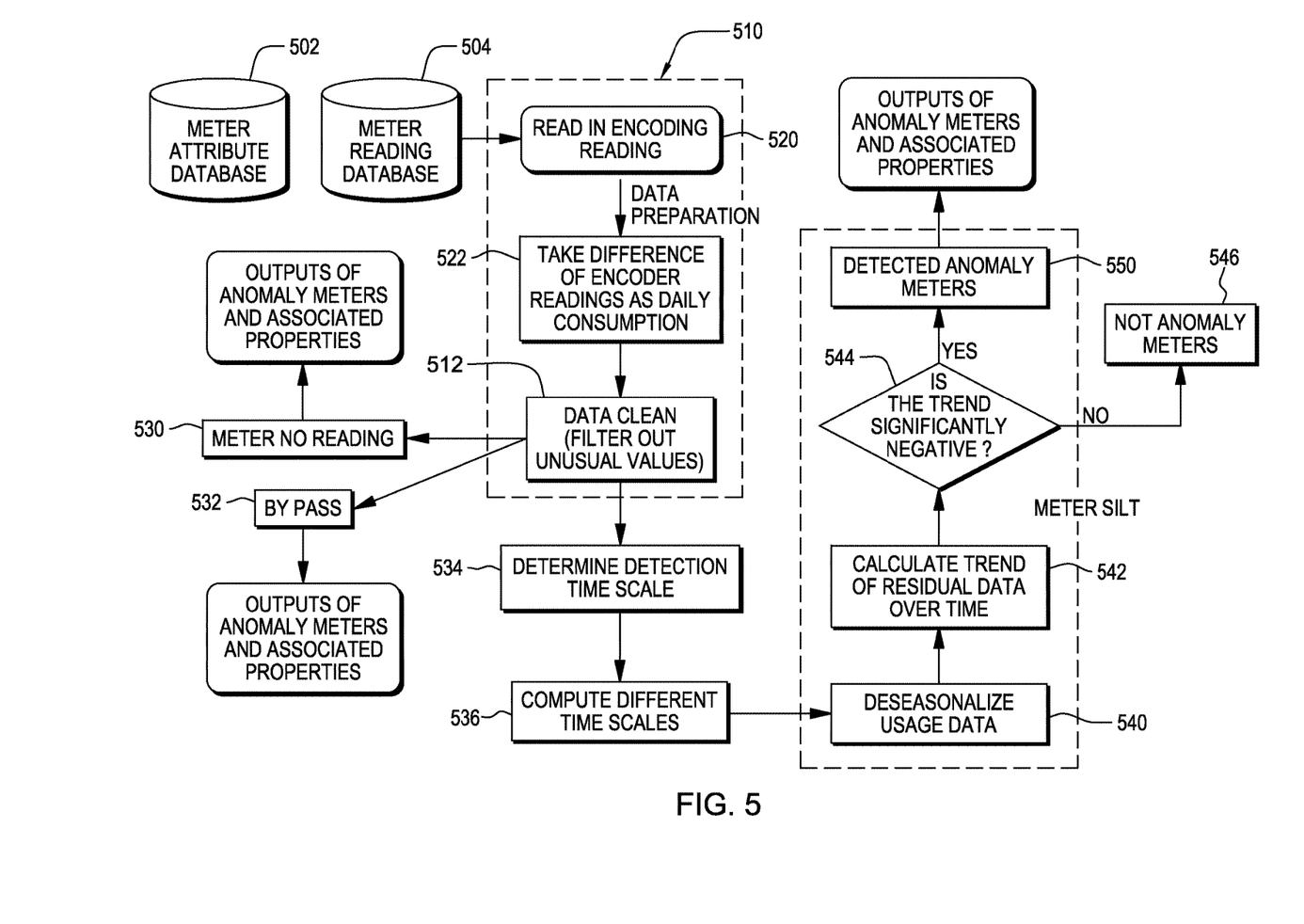
FIG. 5 is depicts a procedure for detecting meter reading anomalies in an embodiment of the invention.

FIG. 5 shows a procedure for identifying anomalous meters. Data are obtained from metering system data base. There are two types of data used. One is meter reading 502 which records customer consumption either daily or monthly. The other type of data is meter attributes 504 which includes meter information such as meter size, type, age and customer information such as household size and demographical attributes.

Figure 6:
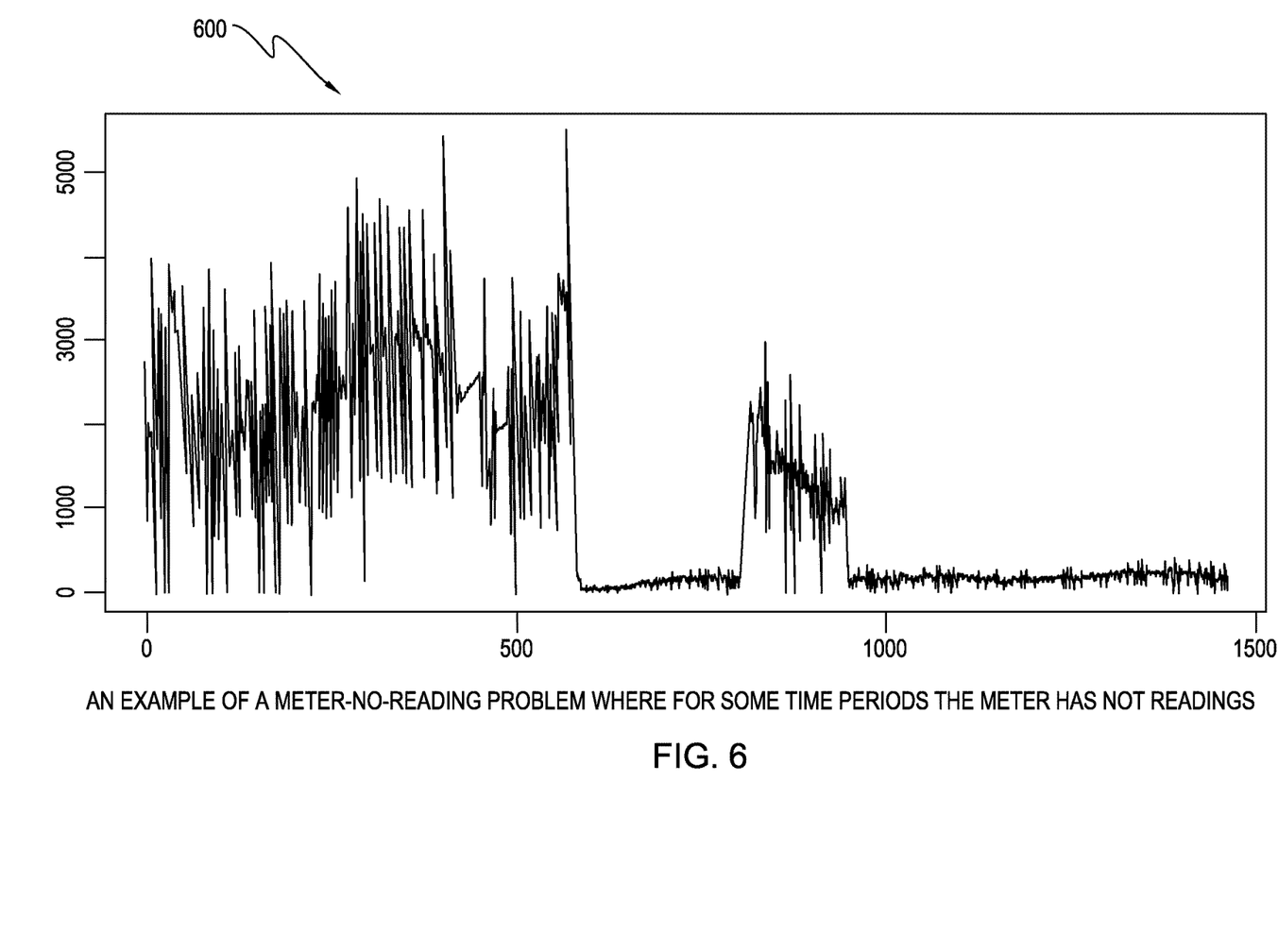
FIG. 6 is a graph showing a meter reading pattern where for some time periods the meter has no readings.
Figure 7:
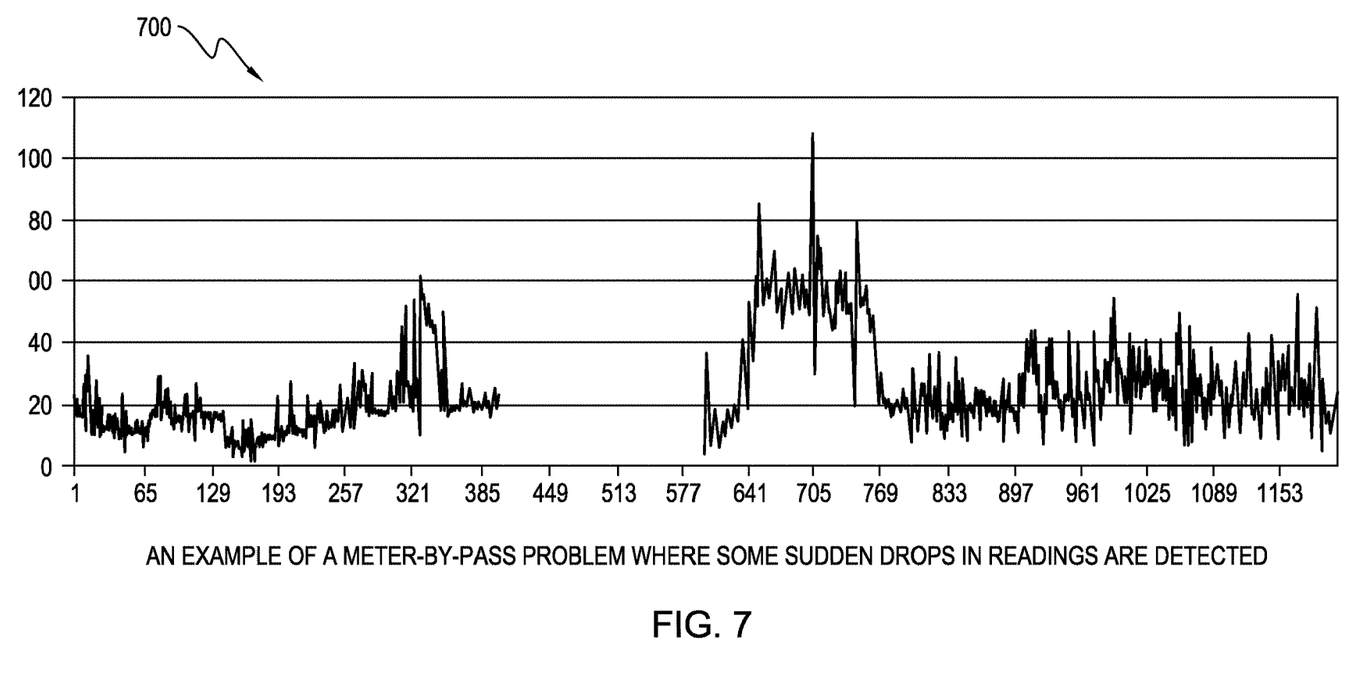
FIG. 7 gives an example of a meter-by-pass problem where some sudden drops in reading are detected.
Figure 8:
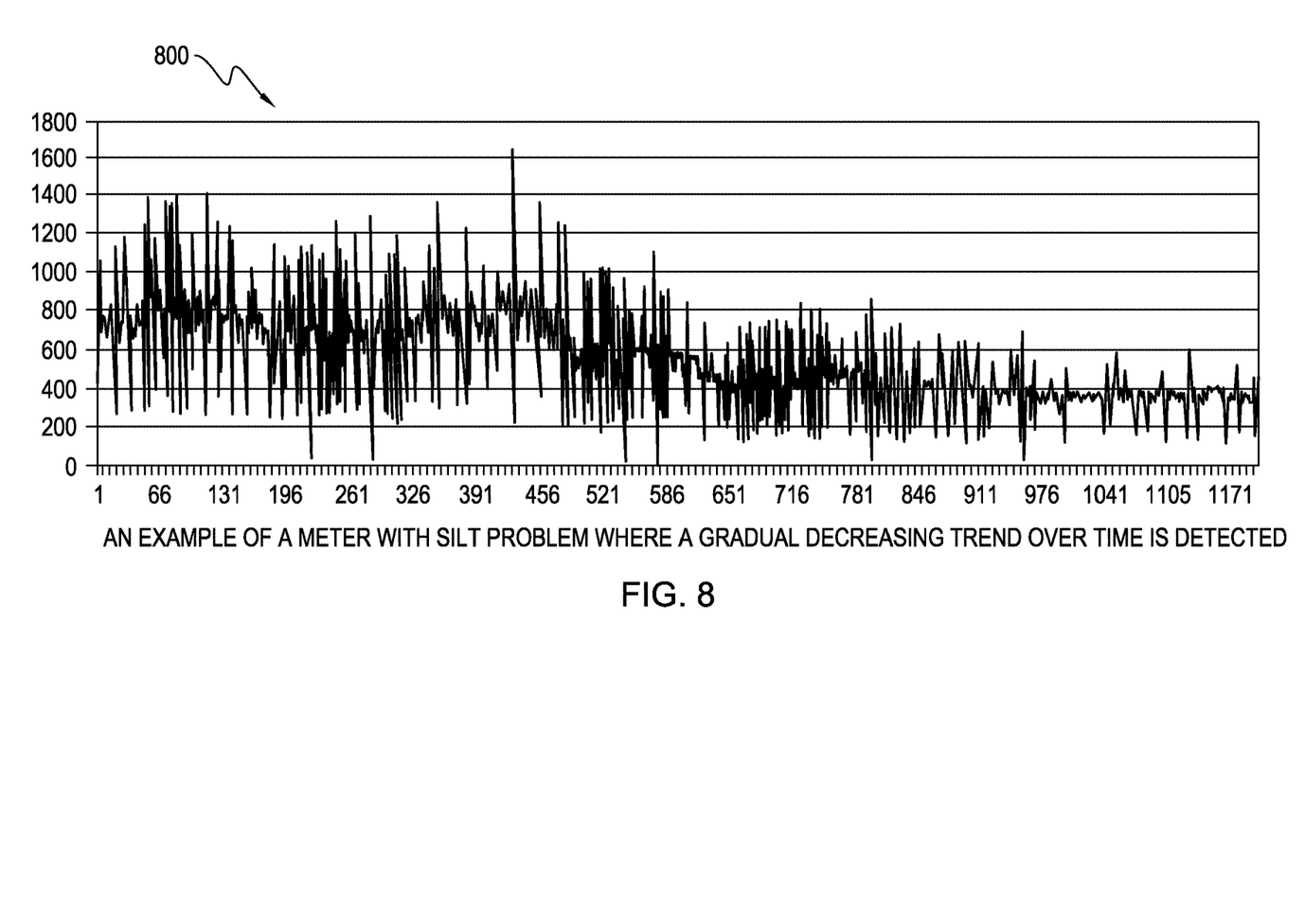
FIG. 8 shows an example of a meter reading pattern of a meter with a silt problem where a gradually decreasing trend over time is detected.

This algorithm is used to detect three types of anomalies, meter-no-reading, meter-by-pass and meter-silting. Meter-no-reading refers to meters that have not been read for some periods, and FIG. 6 is a graph showing a meter reading pattern 600 where for some time periods the meter has no readings. Meter-by-pass for example, due to intentional theft, refers to meter readings having sudden drops at some item, and FIG. 7 gives an example 700 of a meter-by-pass problem where some sudden drops in reading are detected. Meter-silting for example, caused by sand silting, refers to meter readings having a gradually decreasing trend over time, and FIG. 8 shows an example 800 of a meter reading pattern of a meter with a silt problem where a gradually decreasing trend over time is detected.

With reference again to FIG. 5, data preparation includes two steps. The first step 510 is to convert the original accumulative readings to daily consumption, and this is followed by data cleaning 512. The two types of anomalies, "no reading" and "by-pass" can be detected in the process of data cleaning, discussed below. Any suitable algorithm or procedure may be used to detect a no-reading pattern, for example of the type shown in FIG. 6; and, similarly, any suitable procedure may be used to identify a pattern, for example of the type shown in FIG. 7, demonstrating a meter by-pass.

With the example shown in FIG. 5, data are read in at 520, and step 522 is to take the difference of encoder readings as daily consumption. Data cleaning is performed at 512. "No reading" and "by-pass" types of meter defects can be detected, as represented at 530 and 532, through data cleaning process which removes the outlier meters with pattern of sudden change.

In an embodiment of the invention, the first step of data cleaning is to remove outliers—that is, consumption values that, according to a defined procedure, are determined to be unusual and thus removed from the data set. Then, the algorithm detects, for each meter or meter account, if there is a given time period or time window, such as three months, over which the consumption is zero, or below some given threshold value. These meters are referred to as meters with no readings, or meter-no-reading.

The data from the meters having no readings are removed from the data being analyzed, and the next step in the data cleaning process is to identify the meters having a sudden change in consumption values. Any suitable procedure may be used to identify these meters. For instance, a moving time window, three months for example, may be established. The data from a meter are then analyzed to determine if the average consumption for any three month period is significantly different from the average consumption of the previous three months. If there is such a sudden change of the average consumption, determined using any suitable criteria, the meter is identified as a meter-by-pass.

A confounding trend that can be explained by external factors may be removed before detection analysis, and a seasonality of consumption pattern may be removed before analysis to avoid a misleading conclusion. The confounding trend may be due, for example, to the impact of utility conservation policy. The seasonality refers to the fact that higher consumption in summer and lower consumption in winter.

Step 534 is to determine the detection time scale, such as daily and monthly values, step 536 is to compute different time scales, and usage data may be de-seasonalized at step 540. Steps 542 and 544 are used to detect meters with a silting problem. At step 542, the trend of residual data over time is calculated, and step 544 is to determine whether this trend is significantly negative, as determined in accordance with any appropriate criteria. If there is no significant negative trend, then, as represented at 546, there are not any meters having a meter-silting anomaly. If there is a significant negative trend, meters that possibly have a meter-silting anomaly are identified, and these meters can be inspected to identify, at step 550, any actually anomalous meters.

Embodiments of the invention take into account different time scales, such as monthly and daily collected data. Outputs include the list of anomaly detected meters, associated anomaly scores and their own properties. The anomaly score is used to measure the significance of an anomaly and to rank the meters to provide examination priorities.

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the true spirit and scope of the present invention.

What is claimed is:

1. A method of detecting anomalies in a metering system comprising a multitude of meters used to measure usage of a defined commodity, the method comprising:
   using a communications device for collecting data from the meters, including data representing usage of the defined commodity;
   using specified data including meter size, meter age, and last inspection dates for selecting a group of the meters for inspection, including
      inputting the specified data into an analytics management system, and
      the analytics management system providing a list of possibly defective meters;
   inspecting the meters on the list for one or more defined defects, including after the list of possibly defective meters is provided, analyzing the data collected from the group of meters selected for inspection over a given time period to identify any of the meters showing at least one of a defined group of anomalous malfunctioning usage patterns;
      for each of the meters selected for inspection and showing one of the anomalous malfunctioning usage patterns, determining an anomaly score for the usage pattern shown by the meter; and
      using the anomaly scores to rank the meters selected for inspection and showing the anomalous malfunctioning usage patterns to provide examination priorities for inspecting the meters.

2. The method according to claim 1, wherein the group of defined types of anomalous usage patterns includes meter-no-reading, meter-by-pass, and meter-silting.

3. The method according to claim 1, wherein the step of using the anomaly scores includes the steps of:
   identifying a threshold for the anomaly scores; and
   ranking the meters showing the anomalous usage patterns having anomaly scores above the threshold.

4. The method according to claim 1, wherein the analyzing the data collected includes converting the collected data to data representing consumption of the defined commodity over defined equal periods of time.

5. The method according to claim 4, wherein:
   the data representing consumption includes a respective one set of data values from each of the meters; and
   the analyzing the data further includes analyzing the set of data values from each of the meters to determine whether the set of data values from said each of the meters changes in a defined way over a defined period of time to identify the meters showing one or more of the types of anomalous usage patterns.

6. A method of detecting anomalies in a metering system comprising a multitude of meters used to measure usage of a defined commodity, the method comprising:
   using a communications device for collecting data from the meters, including data representing usage of the defined commodity;
   using specified data including meter size, meter age, and last inspection dates for selecting a group of the meters for inspection, including
      inputting the specified data into an analytics management system, and
      the analytics management system providing a list of possibly defective meters;
   inspecting the meters on the list for one or more defined defects, including after the list of possibly defective meters is provided, analyzing the data collected from the group of meters selected from inspection over a given time period to identify any of the meters showing at least one of a defined group of anomalous malfunctioning usage patterns;
      for each of the meters selected for inspection and showing one of the anomalous malfunctioning usage patterns, determining an anomaly score for the usage pattern shown by the meter; and
      using the anomaly scores to rank the meters selected for inspection and showing the anomalous malfunctioning usage patterns for inspecting the meters, and
   wherein the analyzing the data collected from the group of meters selected for inspection includes:
      identifying said each meter as showing a meter-no-reading anomaly when the change in the set of data from said each meter over the defined period of time satisfies a first defined criteria; and
      identifying said each meter as showing a meter-silting anomaly when the change in the set of data from said each meter over the defined period of time satisfies a second defined criteria.

7. The method according to claim 1, wherein the analyzing the data includes:
   identifying seasonal usage patterns; and
   adjusting the data collected from the meters based on said seasonal usage patterns.

8. The method according to claim 7, wherein the adjusting the data collected includes adjusting the data collected from the meters before using the collected data to identify any of the meters showing the at least one type of anomalous usage pattern.

9. The method according to claim 1, wherein the only data used to identify any of the meters showing the at least one type of anomalous usage pattern are the data representing usage of the defined commodity.

10. A system for detecting anomalies in a metering network comprising a multitude of meters used to measure usage of a defined commodity, the system comprising:

one or more processors having a processing unit operatively coupled to a memory, the one or more processors configured for:
  collecting data from the meters, including data representing usage of the defined commodity;
  using specified data including meter size, meter age, and last inspection dates for identifying a group of the meters for inspection, including
    inputting the specified data into an analytics management system, and
    the analytics management system providing a list of possibly defective meters;
  inspecting the meters on the list for one or more defined defects, including after the list of possibly defective meters is provided, analyzing the data collected from the group of meters identified for inspection over a given time period to identify any of the meters showing at least one of a defined group of anomalous malfunctioning usage patterns;
    for each of the meters identified for inspection and showing one of the anomalous malfunctioning usage patterns, determining an anomaly score for the usage pattern shown by the meter; and
    using the anomaly scores to rank the meters identified for inspection and showing the anomalous malfunctioning usage patterns to provide examination priorities for inspecting the meters.

11. The system according to claim 10, wherein the step of using the anomaly scores includes the steps of:
  identifying a threshold for the anomaly scores; and
  ranking the meters showing the anomalous usage patterns having anomaly scores above the threshold.

12. The system according to claim 10, wherein the analyzing the data collected includes:
  converting the collected data to a set of data values representing daily consumption of the defined commodity over defined equal periods of time, said data representing consumption including a respective one set of data values from each of the meters; and
  analyzing the set of data values from each of the meters to determine whether the set of data values from said each of the meters changes in a defined way over a defined period of time to identify the meters showing one or more of the types of anomalous usage patterns.

13. The system according to claim 10, wherein the analyzing the data includes:
  identifying seasonal usage patterns; and
  adjusting the data collected from the meters based on said seasonal usage patterns before using the collected data to identify any of the meters showing the at least one type of anomalous usage pattern.

14. An article of manufacture comprising:
  at least one non-transitory computer readable medium having computer readable program code logic to detect anomalies in a metering system comprising a multitude of meters used to measure usage of a defined commodity, the computer readable program code logic, when executing, performing the following:
    collecting data from the meters, including data representing usage of the defined commodity;
    using specified data including meter size, meter age, and last inspection dates for identifying a group of the meters for inspection, including
      inputting the specified data into an analytics management system, and
      the analytics management system providing a list of possibly defective meters;
    inspecting the meters on the list for one or more defined defects, including after the list of possibly defective meters is provided, analyzing the data collected from the group of meters identified for inspection over a given time period to identify any of the meters showing at least one of a defined group of anomalous malfunctioning usage patterns;
      for each of the meters identified for inspection and showing one of the anomalous malfunctioning usage patterns, determining an anomaly score for the usage pattern shown by the meter; and
      using the anomaly scores to rank the meters identified for inspection and showing the anomalous malfunctioning usage patterns to provide examination priorities for inspecting the meters.

15. The article of manufacture according to claim 14, wherein:
  the defined group of anomalous usage patterns includes meter-no-reading, meter-by-pass, and meter-silting.

16. The article of manufacture according to claim 14, wherein the analyzing the data collected includes:
  converting the collected data to data representing daily consumption of the defined commodity over defined equal periods of time, said data representing consumption including a respective one set of data values from each of the meters; and
  analyzing the set of data values from each of the meters to determine whether the set of data values from said each of the meters changes in a defined way over a defined period of time to identify the meters showing the anomalous usage patterns.

17. The article of manufacture according to claim 14, wherein the analyzing the data includes:
  identifying seasonal usage patterns; and
  adjusting the data collected from the meters based on said seasonal usage patterns.

18. A method of detecting anomalies in a metering system comprising a multitude of meters used to measure usage of a defined commodity, the method comprising:
  using a communications device for collecting data from the meters, including data representing usage of the defined commodity;
  using specified data including meter size, meter age, and last inspection dates for selecting a group of the meters for inspection, including
    inputting the specified data into an analytics management system, and
    the analytics management system providing a list of possibly defective meters;
  inspecting the meters on the list for one or more defined defects, including after the list of possibly defective meters is provided, analyzing the data collected from the group of meters selected for inspection over a given time period to identify any of the meters showing any one of a defined set of anomalous malfunctioning usage patterns;
  for each of the meters selected for inspection and showing one of the anomalous malfunctioning usage patterns, determining an anomaly score for the usage pattern shown by the meter; and
  ranking the meters selected for inspection and showing the anomalous malfunctioning usage patterns based on the anomaly scores to provide examination priorities for inspecting the meters.

19. The method according to claim 18, wherein the set of defined types of anomalous usage patterns includes a meter-no-reading pattern, a meter-by-pass pattern, and a meter-silting pattern.

20. The method according to claim 18, wherein the ranking the meters includes:
identifying a threshold for the anomaly scores; and
ranking the meters showing the anomalous usage patterns having anomaly scores above the threshold.

21. The method according to claim 18, wherein the analyzing the data collected includes converting the collected data to data representing consumption of the defined commodity over defined equal periods of time.

22. The method according to claim 21, wherein:
the data representing consumption of the defined commodity over defined equal periods of time includes a respective one set of data values from each of the meters; and
the analyzing the data further includes analyzing the set of data values from each of the meters to determine whether the set of data values from said each of the meters changes in a defined way over a defined period of time to identify the meters showing one or more of the types of anomalous usage patterns.

23. A method according to claim 1, wherein:
each of the meters includes a storage compartment for storing collected data before transmission to a data collection system;
each of the meters is configured with a receiver/transmitter telemetry device for sending signals to the data collection system;
the data collection system includes the communications device; and
the analyzing the data includes processing the data from the meters by a computer system with processor and memory.

24. The method according to claim 1, wherein:
the selecting a group of the meters for inspection includes providing a list of possibly defective ones of the meters; and
the method further comprises using said list of possibly defective meters to identify ones of the meters that are to be inspected.

* * * * *